Jan. 24, 1967   J. V. O'NEILL ETAL   3,299,957
DRILL STRING SUSPENSION ARRANGEMENT
Original Filed Aug. 26, 1960   6 Sheets-Sheet 5
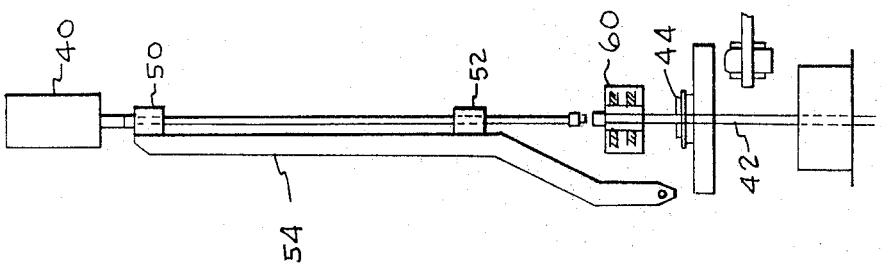
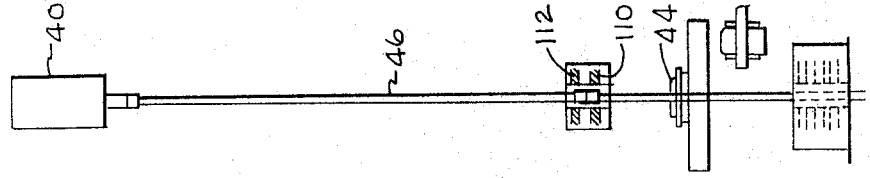
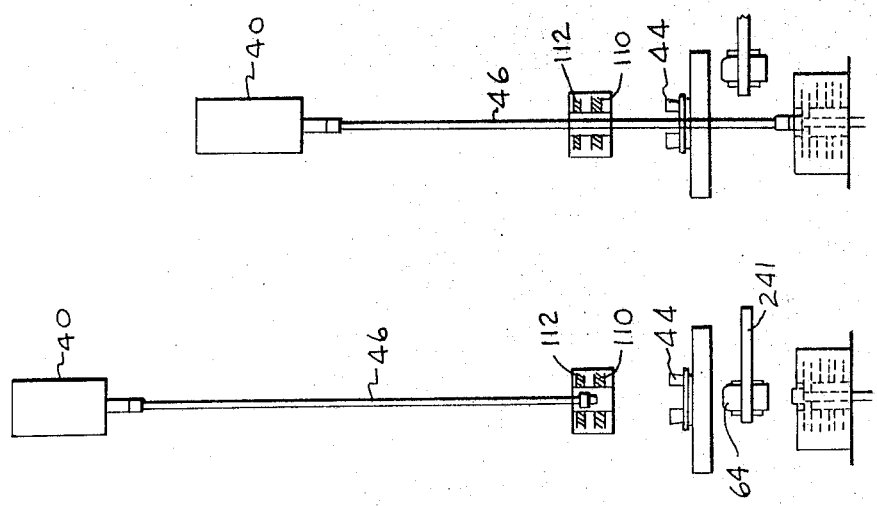
INVENTORS
JOSEPH V. ONEILL
BY GEORGE HOMANICK
WILSON, SETTLE, BATCHELDER
ATT'YS.   & CRAIG

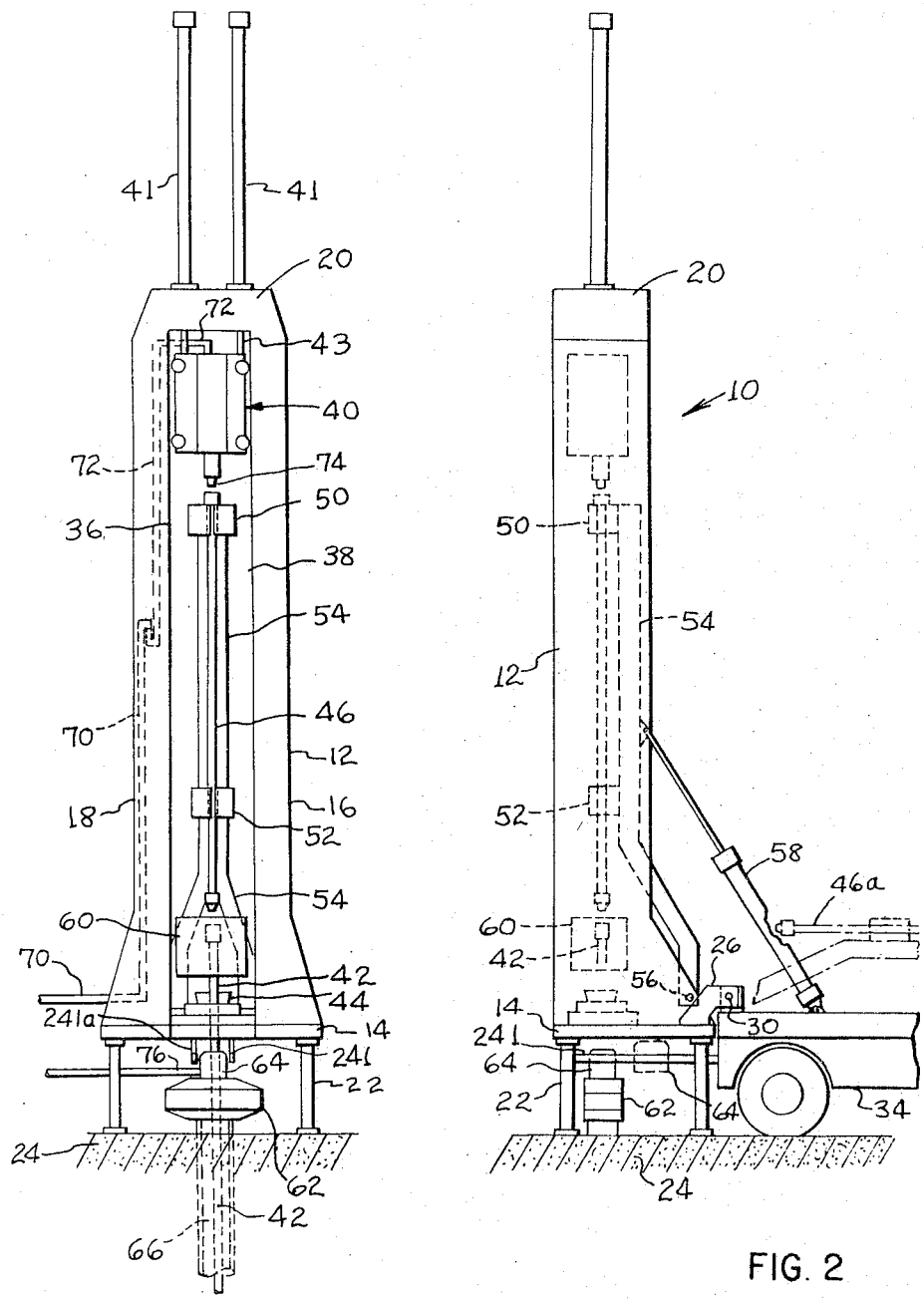

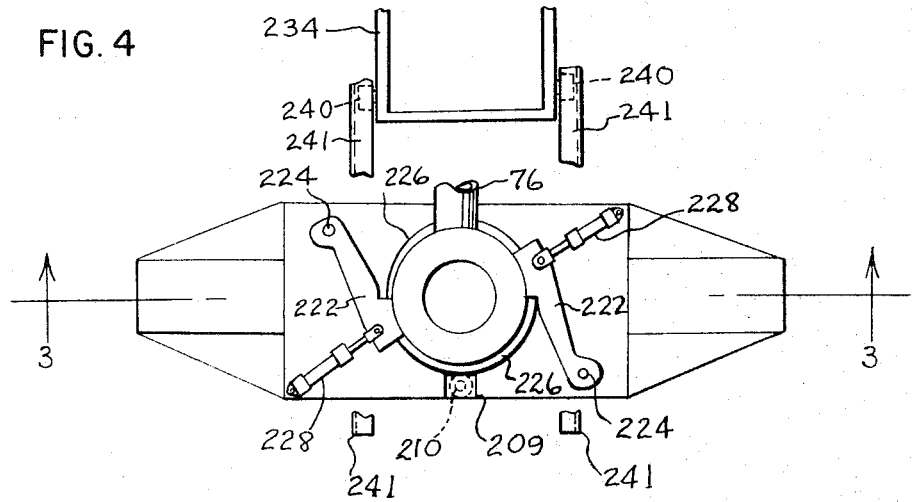
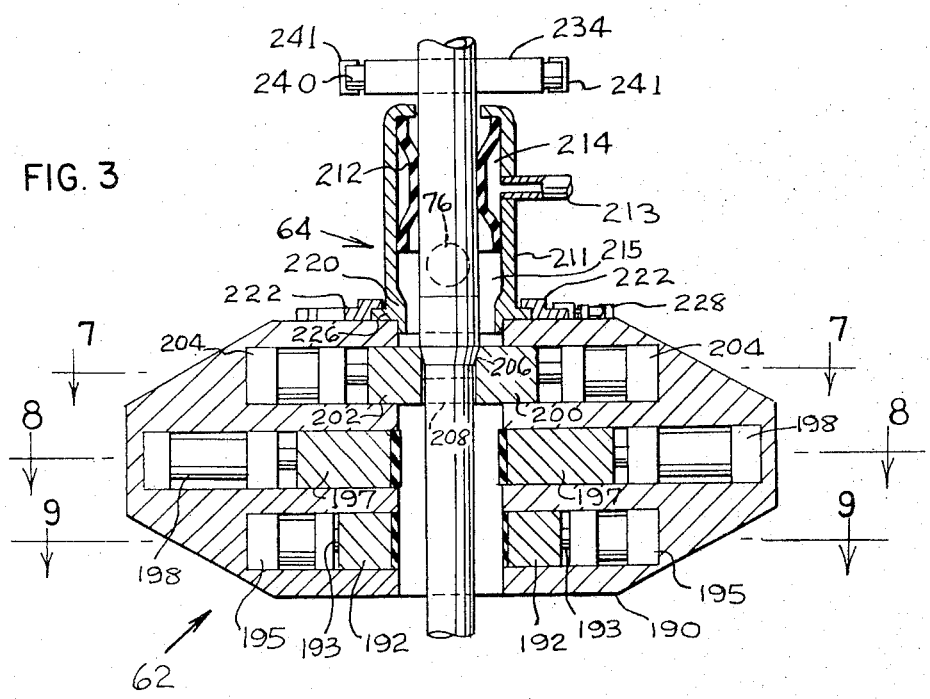

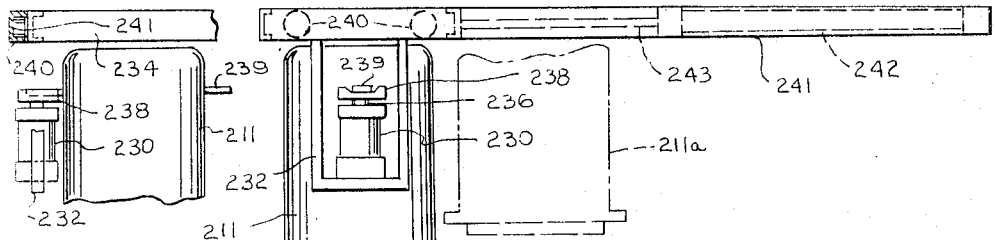
FIG. 6    FIG. 5
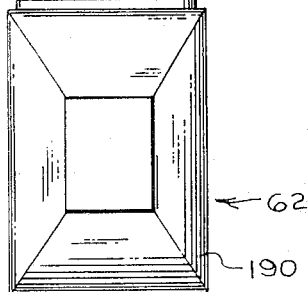
FIG. 7
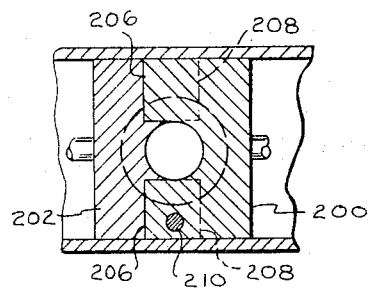
FIG. 8
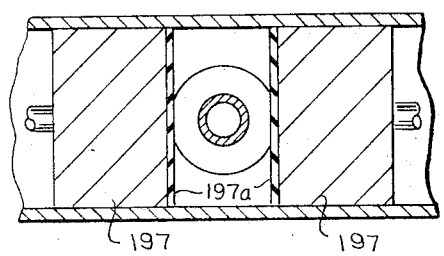
FIG. 9
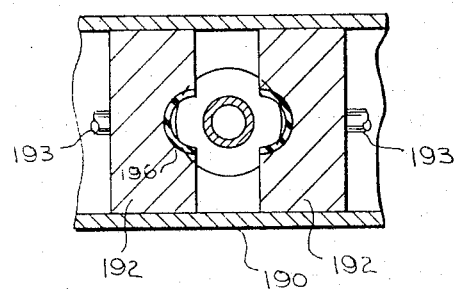

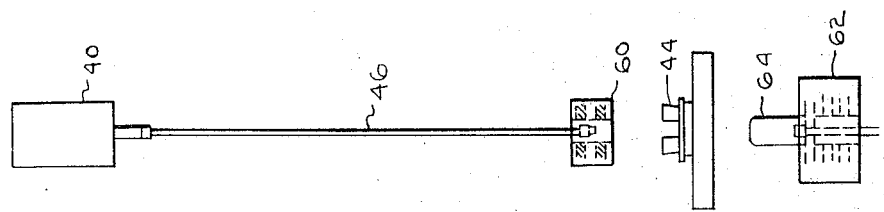
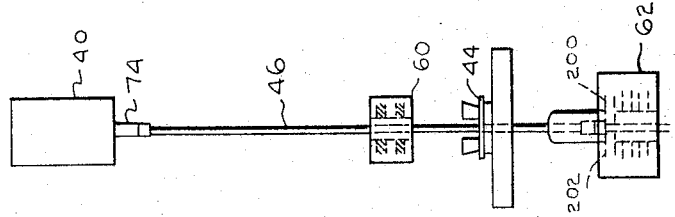
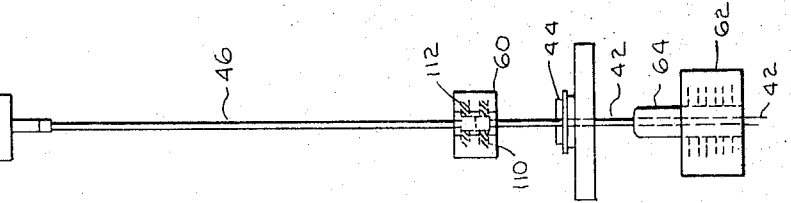
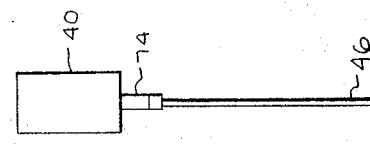

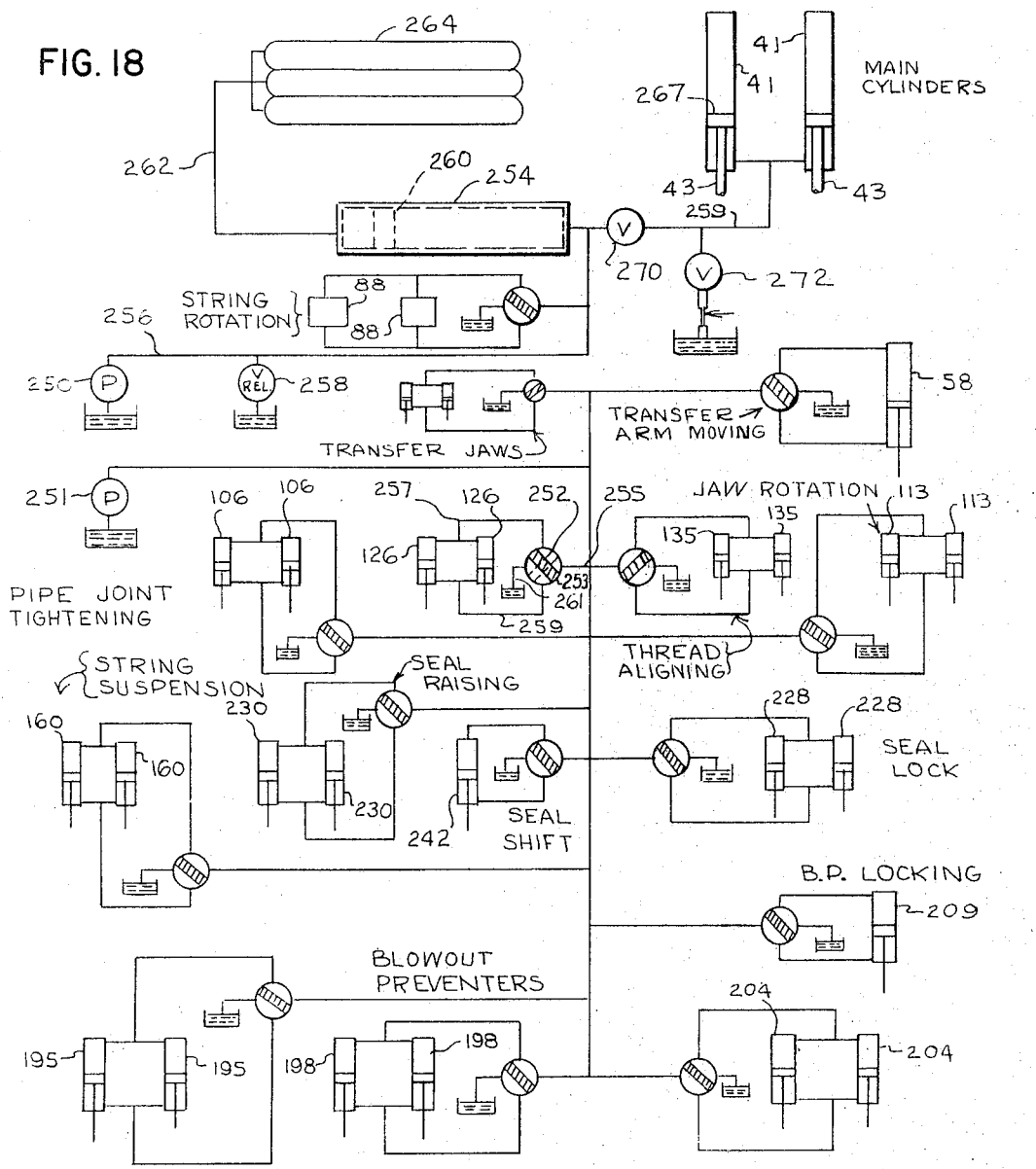

United States Patent Office 3,299,957
Patented Jan. 24, 1967

3,299,957
DRILL STRING SUSPENSION ARRANGEMENT
Joseph V. O'Neill, Inkster, and George Homanick, Livonia, Mich., assignors to Leyman Corporation, Cincinnati, Ohio
Original application Aug. 26, 1960, Ser. No. 52,274, now Patent No. 3,158,213, dated Nov. 24, 1964. Divided and this application Aug. 14, 1964, Ser. No. 394,097
3 Claims. (Cl. 166—77.5)

This invention relates to well drilling apparatus, and particularly to apparatus which permits the drilling to be carried out automatically with a minimum of human intervention and effort.

The invention in one of its embodiments comprehends a derrick structure having a vertically slidable drill head for suspending and rotating a pipe string in a well hole, together with a mechanism below the drill head for cooperating therewith in assembling and disassembling pipe into and out of the string in an automatic manner. The embodiment further comprehends a blow out preventer mechanism and sealing mechanism arranged at the base of the derrick structure, together with power means for removing the seal mechanism from the well hole axis when desired. Preferably all of the components of the apparatus are operated in an automatic or semi-automatic manner, as by a system of fluid motors and hydraulic cylinders.

One object of the invention is to provide a well drilling apparatus which can be operated with minimum direct human effort or intervention.

Another object of the invention is to provide an apparatus having a novel fluid pressure system for efficiently utilizing power from a prime mover such as a diesel engine, the arrangement being such that the drilling operations can be carried out with a relatively low cost power plant.

An additional object of the invention is to provide a well drilling apparatus which can be controlled with simple control devices.

Another object is to provide a drilling rig having an improved arrangement for automatically removing and installing a seal at the base of the rig, whereby to facilitate the operation of removing a string from the well hole.

A further object of the invention is to provide a drilling apparatus which assumes an improved control over the pipe during the drilling periods, string connecting periods, and string disconnecting periods.

A still further object is to provide a rig which is of such design as to handle different size pipe and casing with minimum adjustment of the rig components.

Other objects of this invention will appear in the following description and appended claims, reference being had to the accompanying drawings forming a part of this specification wherein like reference characters designate corresponding parts in the several views.

Referring to the drawings:

FIG. 1 is a front elevational view of one embodiment of the invention.

FIG. 2 is a right side elevational view of the FIG. 1 embodiment.

FIG. 3 is a sectional view on line 3—3 in FIG. 4 and illustrating the details of a sealing and blow-out preventing mechanism employed in the FIG. 1 embodiment.

FIG. 4 is a top plan view of the structure shown in FIG. 3.

FIG. 5 is a right end elevational view of the FIG. 3 mechanism.

FIG. 6 is a fragmentary view taken at right angles to FIG. 5.

FIG. 7 is a fragmentary sectional view on line 7—7 in FIG. 3.

FIG. 8 is a fragmentary sectional view on line 8—8 in FIG. 3.

FIG. 9 is a fragmentary sectional view on line 9—9 in FIG. 3.

FIGS. 10 through 17 are schematic illustrations showing a sequence of movements which may be employed during operation of the FIG. 1 embodiment.

FIG. 18 is a schematic illustration of a fluid distribution system which may be employed in operating and controlling the FIG. 1 embodiment.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings and particularly FIGS. 1 and 2, there is disclosed a well drilling apparatus 10 including an upstanding derrick structure 12 defined by the bags 14, the two upstanding side portions 16 and 18, and the upper cross head portion 20. Suitable posts or columns 22 may be employed to support the derrick on the well site 24. It will be seen from FIG. 2 that the derrick is equipped with the arm structure 26 which is pivotally interconnected at 30 with an upstanding mount structure carried on the rear portion of a trailer 34. The arrangement is such as to permit the entire derrick structure to be pivoted about the pivot axis 30 so as to be disposed in a horizontal position above the trailer 34 for transporting same between drilling sites. The details of this transport arrangement are more completely shown in co-pending application Serial No. 42,132, filed July 11, 1960, and entitled "Portable Drill Rig."

Referring to FIG. 1, the derrick cross head portion 20 mounts two fluid cylinders 41, and the derrick side portions 16 and 18 mount the vertical guide rails 36 and 38, said rails serving to slidably guide the drill string suspension means 40 for vertical movement within the derrick structure. It will be understood that vertical motion is imparted to suspension means 40 by the introduction and exhaustion of pressure fluid to and from the lower ends of cylinders 41, i.e. below the pistons located therewithin. The pistons are carried on piston rods 43 which connect with suspension means 40, and it will therefore be seen that the suspension means can be raised and lowered by the appropriate direction of pressure fluid relative to cylinders 41.

In FIG. 1 the suspension means is shown in its elevated position, and the drill string 42 is shown in a position temporarily supported by the temporary suspension means 44. In the FIG. 1 position the space between temporary suspension means 44 and the suspension means 40 is occupied by a drill pipe 46, and the components of the apparatus are shown in the process of assembling the pipe 46 into the drill string. The pipe 46 is, as shown in FIG. 1, gripped by the jaw structures 50 and 52 carried on the upstanding transfer arm 54. As shown in FIG. 2 the transfer arm is fulcrummed for pivotal movement around the axis designated by numeral 56, and power for the pivotal movement is provided by the fluid cylinder means 58. It will be understood that transfer arm 54 serves as a means for delivering the pipe, such as pipe 46, between a vertical position aligned with the pipe string and a substantially horizontal position 46a located away from the drilling apparatus. In position 46a the pipe can be conveyed by means (not shown) to a storage area. In this connection it will be realized that during a drilling operation considerable numbers of pipe are required to be shuttled between the storage areas and the drill string as the drilling operation proceeds and as it becomes necessary to disassemble the pipe string for bit replacement operations and the like. Under the present invention the details of the storage area may be varied considerably, but one suitable arrangement is shown in the above-mentioned patent application.

Referring again to FIG. 1, it will be seen that the upper portion of the pipe string 42 extends within a mechanism 60. Mechanism 60 serves to alternately tighten and loosen the joint between the upper pipe such as pipe 46 and the pipe string 42. The details of this mechanism are better shown in FIGS. 5 through 7, but it will be understood that the mechanism comprehends a plurality of powered sets of jaws for gripping the adjacent portions of adjoining pipe sections, together with rotary power means for applying a torque to loosen or tighten the threaded joint between sections.

In the space below the derrick structure 14 there is provided a blow-out mechanism 62, and a sealing mechanism 64. The details of these mechanisms are illustrated in FIGS. 11 through 15. Mechanism 64 serves to seal the joint around the rotary drill string. Mechanism 62 serves generally to close off the well hole from the above-earth atmosphere in the event of excessive pressure development within the well hole. The illustrated apparatus can be utilized with conventional mud drilling procedures or with air drilling procedures. In either case, the fluid (air or mud) will be utilized to carry off the cuttings formed at the bottom of the well hole as the drilling operation proceeds. The fluid may be circulated by introduction thereof into a pipe 70 and flexible tube 72. The suspension means 40 is suitably constructed so that the fluid is then fed into the drill string 42 via the hollow threaded spindle 74. The fluid flows downwardly within string 42 out the conventional openings in the drill bit at the bottom of the well hole, and upwardly in the annular space 66 where it is then passed through the blow-out preventer 62 and out the discharge pipe 76 to the atmosphere (if air is used) or to a mud reclamation system (if mud is used.)

From the above brief discussion, it will be seen that the illustrated apparatus comprehends the following components:

(1) Pipe transfer means 54.
(2) Drill string suspension means 40.
(3) Joint loosening-tightening mechanism 60.
(4) Temporary string suspension means 44.
(5) Sealing and blow-out prevention means 64 and 62.

Items 1 through 4, inclusive, are described in detail in our United States Patent No. 3,158,213, to which reference may be had for a detailed description of these elements.

*Blow-out preventers 62 (FIGS. 3 through 9)*

The illustrated blow-out preventer 62 comprises a housing structure 190 suitably partitioned to provide guideways for the slidable plates 192. Each plate is carried on the piston rod 193 of a fluid cylinder 195. The facing surfaces of the plates are concave as shown in FIG. 9, and a suitable rubber facing 196 is provided on the concave surfaces so as to seal against the pipe string surfaces after inward powering of cylinders 195 (as during the development of excessively high pressures within the well hole). The cylinders may be powered automatically by pressure-responsive switch-and-valve arrangements, or the cylinders may be powered in a semi-automatic manner under human control.

The plates 192 are operative to prevent blow-out only when string 44 is within the well hole. In order to prevent blow-outs when the string is disassembled (i.e. out of the hole) there is provided a second blow-out preventer defined by plates 197. These plate may be powered by fluid cylinders 198, and as shown in FIG. 8 the facing surfaces of the plates mate with one another so as to enable the plates to seal the well hole when the string is disassembled.

The arrangement of parts employed in the FIG. 1 apparatus is such that at certain times an auxiliary means must be utilized to support the string at a point below the seal 64 (to be described later). For this purpose there are provided the jaws 200 and 202 (FIGS. 3 and 7), each suitably connected with the piston rod of a fluid cylinder 204. Lateral edge areas 206 and 208 of the respective jaws are of reduced vertical thickness so as to overlap one another (FIG. 7). Additionally the housing structure 190 mounts a small vertical fluid cylinder 209 (FIG. 4) which is provided with a piston rod 210 (FIGS. 4 and 7) configured as a shot pin. By this arrangement the shot pin may be driven through aligned openings in the overlapping portions 206 and 208 so as to prevent separation of the jaws 200 and 202. In this connection it will be understood that the fluid pressures in cylinders 204 need not be maintained at an extremely high value in order to maintain the jaws 200 and 202 in operative supporting engagement with the drill string 44 since the locking pin 210 acts as a positive abutment element to prevent separation of these jaws. By the illustrated arrangement the extensive weight of the string may be supported by the jaws.

*Seal 64 (FIGS. 3 through 6)*

As shown in FIG. 3 the seal comprises an upright casing 211 removably carried atop the housing 190 and mounting a deflectable annular sealing sleeve 212. The upper and lower ends of the sleeve are suitably sealed to casing 211, and a pressure line 213 is connected to casing 211 so as to develop a suitable pressure in the peripheral space 214. By this arrangement the deformable sleeve 212 is caused to have a satisfactory sealing contact with the surface of the rotating drill string during earth boring operations. The purpose of the seal is to direct the upwardly travelling cuttings from the space 215 outwardly through the discharge conduit 76. As previously noted in connection with the description of FIG. 1, the cuttings may be carried off with air or mud.

The drill bit is of course larger in diameter than the drill string, and accordingly the seal 64 must be removed from atop housing 190 when it is desired to remove the bit from the hole. A suitable apparatus for this purpose is shown in FIGS. 3 through 6.

As shown in FIG. 3 the seal casing 211 is provided with a pilot-forming extension 220 which guides it into position on housing 190 during installation. Removable locking of the seal casing is provided with the latch arms 222 which are pivoted at 224 (FIG. 4) so as to be movable into positions overlying flange 226 on casing 211. Powering of the latch arms to and from their latching positions may be accomplished with the two small fluid cylinders 228.

When the latch arms are in their unlatched positions the seal casing 211 may be moved upwardly off housing 190 by introduction of pressure fluid into cylinders 230 (FIGS. 5 and 6). Each of these cylinders is carried on a bracket 232 which depends from a horizontally movable trolley 234. The piston rod 236 for each cylinder carries a crade 238 which serves as a seat for a lug 239 projecting from casing 211. For purposes of illustrating other components, the lugs, cradles and cylinders have been omitted from FIGS. 3 and 4. These elements are shown in FIGS. 5 and 6.

Trolley 234 may be formed as a rectangular frame and may be equipped with rollers 240 for its horizontal movement along the fixed rails 241. A fluid cylinder 242 and piston rod 243 may be provided for trolley powering purposes.

The general sequence of motions during seal removal involves energization of cylinders 230 to lift the seal casing 211 off housing 190, followed by energization of cylinder 242 to move the casing to dotted line position 211a.

Repositionment of the seal onto housing 190 involves the sequential energization of cylinders 242, 230 and 228.

*Operation of the FIG. 1 apparatus*

During the process of drilling a well hole the drill string must be progressively lengthened in order to enable the bit to advance through the earth formations. Periodically the string must be removed from the hole in order to replace a worn bit (as by disconnecting the pipe in the string). The process of removing a string from the well hole may best be visualized by referring to schematic FIGS. 10 through 17.

Initially the string is raised by powering the drill head upwardly from its FIG. 10 position to its FIG. 11 position. At this time pipe 46 is part of the string 42. With the string in the FIG. 11 position the joint between pipe 46 and string 42 may be untorqued, as by suitable radial powering of the jaws 110 and 112, followed by rotation of the jaw 112 assembly. At this time the weight of the string is supported by the jaws of temporary suspension means 44. During each torqueing or untorqueing operation the head 40 will be shifted vertically slightly to accommodate the axial shifting of pipe 46 caused by the threading or unthreading action. The head movement is obtained with cylinders 41.

Referring to FIG. 11, after the joint between pipe 46 and string 42 has been untorqued the jaws 200 and 202 are closed and the jaws in suspension means 44 are opened slightly as shown in FIG. 12, and the drill head is lowered so as to position the pipe string in a supported location in jaws 200 and 202. The spindle 74 in head 40 is then powered rotatably to spin off the joint between pipe 46 and string 42, after which the head 40 may be powered upwardly to the FIG. 13 position.

FIG. 14 illustrates the position of parts after the rotating seal 64 has been powered upwardly away from the blow-out preventers. FIG. 15 shows the rotating seal after it has been moved to the side by its fluid cylinder. FIG. 15 also illustrates the drill head as it moved downwardly to enable pipe 46 to be reconnected with the upper pipe in string 42. In the illustrated embodiment it is necessary to reconnect pipe 46 with string 42 because the drill head cannot reach down below the suspension means 44 to grip the string. When the drill head has been lowered to its FIG. 15 position the fluid motors therein are energized to rotate the pipe 46, and spin on the joint between pipe 46 and string 42. Head 40 may then be powered upwardly to the FIG. 16 position after which suspension means 44 may be locked to the string and the joints spun apart by operation of the fluid motors within head 40. In the spinning-off operation the joint between pipe 46 may first be spun off with jaws 112 opened, and the joint between pipe 46 and spindle 74 may then be spun off with jaws 112 closed.

As shown in FIG. 17, mechanism 60 may be shifted downward slightly to place the lower end of pipe 46 clear of the mechanism, after which the jaws 50 and 52 of arm 54 may be tightened on pipe 46. The transfer arm may then be rocked downwardly to completely remove pipe 46 from the string.

It will be understood that after the uppermost pipe in the string has been removed the succeeding pipe can be removed relatively quickly by repeating certain of the steps outlined above. In this regard it will be noted that removal of the first pipe is complicated by the necessity for removing the seal 64.

Removal of succeeding pipe may be accomplished by lowering head 40 to grasp the string, raising the head to the FIG. 16 position, sequentially untorqueing the two joints, and transferring the untorqued pipe away through the use of transfer arm 54. The operation of assembling the drill string in the well hole and adding thereto can be accomplished in essentially a reverse series of movements from that described above.

FIG. 18 illustrates schematically the general features of a fluid control system which can be employed to operate the illustrated apparatus. In the FIG. 18 arrangement the major fluid-operated cylinders are given numerals corresponding to those employed for the previously described components. Insofar as the pumping of fluid into the various cylinders is concerned, it will be seen that the operating fluid pressures are initially developed by pump means 250 and 251. Pump means 250 which preferably comprise a plurality of pumps feeding a common line supplies the main cylinders 41 and fluid motors 88, which are large energy consumers in the system. It is for this reason among others that pump means 250 is preferably isolated from pump means 251 which feeds the other energy consuming devices in the system. It will be understood that certain of the individual pumps collectively indicated by numeral 251 may be isolated from one another as might best suit operating pressure conditions in particular size rigs. For purpose of detecting localized failure in the electrical or hydraulic components it would be preferable to supply each component from a separate fluid pressure source. However other considerations would rule out such an arrangement in most cases.

In the illustrated arrangement the supply of fluid pressure from pump means 251 to each of the various components may be controlled by a series of individual valve devices, each similar in general character to the other in construction and operational positionment. A description of one valve device will therefore suffice for a description of all.

Referring to an illustrative valve 252 for the pipe tightening jaw cylinders 126, it will be seen that the valve is a four way valve having a movable flow-directing element 253 positionable in either the full line position or dotted line position as shown. One port of the valve communicates with a fluid supply line 255, a second part communicates with a line 257 leading to the upper ends of cylinders 126, a third port communicates with a line 259 leading to the lower ends of cylinders 126, and the fourth port communicates with a line 261 discharging back to the sump for pump means 251. The arrangement is such that when the flow-directing element is in the full line postion pressure fluid is admitted to the upper ends of cylinders 126, and when the flow-directing element is in the dotted line position pressure fluid is admitted to the lower ends of cylinders 126. Conventional electrically-energized push buttons (not shown) may be utilized to operate the flow-directing element between the two positions. It will be understood that in practice various pressure regulating devices (not shown) may be used in the various supply lines to control the pressures and flow rates at desired values.

As previously indicated, each of the control valves in the FIG. 18 arrangement may be of similar construction and operation, and each may be controlled electrically under limit switch control. The drilling of oil wells is not capable of performance in a completely automatic manner from start to finish since some interrupting events (such as the breaking of a drill bit) occur which alter the orderly sequence. Therefore the automatic operational controls are utilized in conjunction with push button controls, as by placing each of the electrical switches in parallel with a manually operated switch. By such an arrangement control of the rig operation can be effected in an automatic or semi-automatic manner as occasion may require.

Returning to FIG. 18, one feature of interest is the employment of an accumulator cylinder 254 in conjunction with pump means 250 so that the pump means may be operated continuously and the accumulator discharged intermittently to develop a satisfactory quick stroke of piston rods 43 without overload on the pump means. Line 256 for the motive fluid is provided with a relief valve 258, the arrangement being such that excessive pressure can be exhausted back to the liquid reservoir. At pressure values below the crack-open pressure of relief valve 258 the pressure fluid is directed from line 256 to an accumulator cylinder 254 and to a line 259 which is provided with a shut-off valve 270. During the lowering movement of pistons 43 valve 270 is closed so that the line 259 pressure can be controllably exhausted to the liquid reservoir via a throttling valve 272. During this period the fluid in line 256 (from pump means 250) is directed exclusively into accumulator cylinder 254 when the pressures are below the crack-open pressure of valve 258; when pressures rise above a predetermined value the pumped fluid is exhausted back to the sump via valve 258. Preferably pumps 250 are variable delivery devices.

As will be apparent from FIG. 18 the fluid introduced into cylinder 254 drives the movable piston 260 to the left. The space to the left of piston 260 is occupied by a pressurized compressible gas such as compressed air supplied from the storage vessels 264. Therefore leftward movement of piston 260 causes a high reaction pressure to be developed on the left face of the piston. By this arrangement the pump means 250 is enabled to charge cylinder 254 with a large quantity of high pressure fluid.

At times in the operating cycle when it is necessary that pistons 267 be moved upwardly in the main cylinders 41 the electrically-operated control valve 270 is opened (with valve 272 closed) so that the pressure reserve stored up in cylinder 254 is applied in the space below pistons 267. By this action the pistons 267 may be powered up quickly, after which the accumulator volume may be again increased by continued operation of pump means 250. The cycle is preferably one wherein the pumps 250 work continuously with a relative low horsepower input. The low horsepower input can be utilized because of the action of the accumulator which in effect serves as a power reservoir to store up power for application to the pistons 267 when needed. The space below pistons 267 may be exhausted when desired by use of the metering escape valve means 272. This valve means may consist of one or more conventional metering devices openable partially or fully in accordance with the desired rate of movement. Generally during stabbing and torqueing of the pipe joints and earth drilling periods the metering valve means will be opened partially so as to give a slow controlled descent of the piston rods 43 and the drill head carried thereby. To effect a fast downward movement of the drill head the metering vave means will be opened fully. It will be understood that control valve 270 and escape valve 272 are opened at different periods accordingly as it becomes desirable to build up or exhaust pressure in the space below pistons 267.

Many features shown in the drawings are illustrative of the constructions which may be employed, and it will be understood that various modifications may be resorted to without departing from the spirit of the invention as set forth in the accompanying claims.

We claim:
1. In a well drilling apparatus having a drill string; string suspension means comprising a fixed housing, pair of opposed jaws mounted in said housing for movement radially into and out of gripping engagement with said drill string, said jaws having cooperating overlapping portions disposed in overlapping relationship with each other when said jaws are in said gripping position, pin means movable through the overlapping portions of said jaws when said jaws are in said gripping position to lock the jaws in said gripping position, and power means coupled to said pin means for moving said pin means into and out of locking relationship with said jaws.

2. The invention defined in claim 1 wherein each of said jaws has a semi-circular recess therein conformed to said drill string and lateral edges extending outwardly from the sides of the recess, the lateral edges of the opposed jaws being inclined in complementary relationship to each other to define said overlapping portions, and means defining pin means receiving openings in said overlapping portions of both jaws located to be in alignment with each other when said jaws are in said gripping position.

3. The invention defined in claim 2 wherein said power means comprises a hydraulic motor coupled to said pin means, and valve means for controlling operation of said motor.

References Cited by the Examiner
UNITED STATES PATENTS

| | | | |
|---|---|---|---|
| 1,966,809 | 8/1934 | Wickersham et al. | 251—1 |
| 2,052,939 | 9/1936 | Otis | 166—84 |
| 2,912,214 | 11/1959 | Allen et al. | 251—31 |
| 2,934,148 | 4/1960 | Allaire | 251—1 |
| 3,023,808 | 3/1962 | St. John | 166—79 |

CHARLES E. O'CONNELL, *Primary Examiner.*

J. A. LEPPINK, *Assistant Examiner.*